(12) United States Patent
Watanabe

(10) Patent No.: US 11,972,156 B2
(45) Date of Patent: Apr. 30, 2024

(54) INFORMATION PROCESSING APPARATUS WITH REPORT CREATION ON USAGE STATE OF PRINTING DEVICES, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Yuta Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/987,712

(22) Filed: Nov. 15, 2022

(65) Prior Publication Data

US 2023/0161519 A1 May 25, 2023

(30) Foreign Application Priority Data

Nov. 22, 2021 (JP) .................................. 2021-189303

(51) Int. Cl.
*G06F 3/12* (2006.01)

(52) U.S. Cl.
CPC .......... *G06F 3/1205* (2013.01); *G06F 3/1253* (2013.01); *G06F 3/1286* (2013.01)

(58) Field of Classification Search
None
See application file for complete search history.

(56) References Cited

U.S. PATENT DOCUMENTS

| | | | | |
|---|---|---|---|---|
| 2017/0277485 | A1* | 9/2017 | Osadchyy | H04W 8/005 |
| 2017/0286023 | A1* | 10/2017 | Akimoto | G06F 3/1256 |
| 2018/0039458 | A1* | 2/2018 | Osadchyy | G06F 3/1205 |
| 2019/0034127 | A1* | 1/2019 | Chhabra | G06F 3/1288 |
| 2019/0354323 | A1* | 11/2019 | Akimoto | H04N 1/00411 |
| 2021/0065101 | A1* | 3/2021 | Nagayama | G06Q 10/0838 |
| 2021/0377417 | A1* | 12/2021 | Nishikawa | G06F 3/1232 |
| 2022/0011995 | A1* | 1/2022 | Yamazaki | H04N 1/32101 |
| 2023/0177470 | A1* | 6/2023 | Kinomoto | G06Q 10/1091 |
| | | | | 705/32 |

FOREIGN PATENT DOCUMENTS

JP 2016-066237 4/2016

* cited by examiner

*Primary Examiner* — Henok Shiferaw
(74) *Attorney, Agent, or Firm* — Venable LLP

(57) ABSTRACT

A device management application acquires device information at a predetermined frequency from a printing device on a network and generates a device list by adding a newly detected printing device. In the device list, for a printing device on which device information is acquired, the device information is accumulated in association with the acquisition date and time, and for a printing device on which device information is not acquired, information indicating no connection is accumulated as device usage information in association with the acquisition date and time. A report is created based on the information accumulated for printing devices included in the device list.

16 Claims, 10 Drawing Sheets

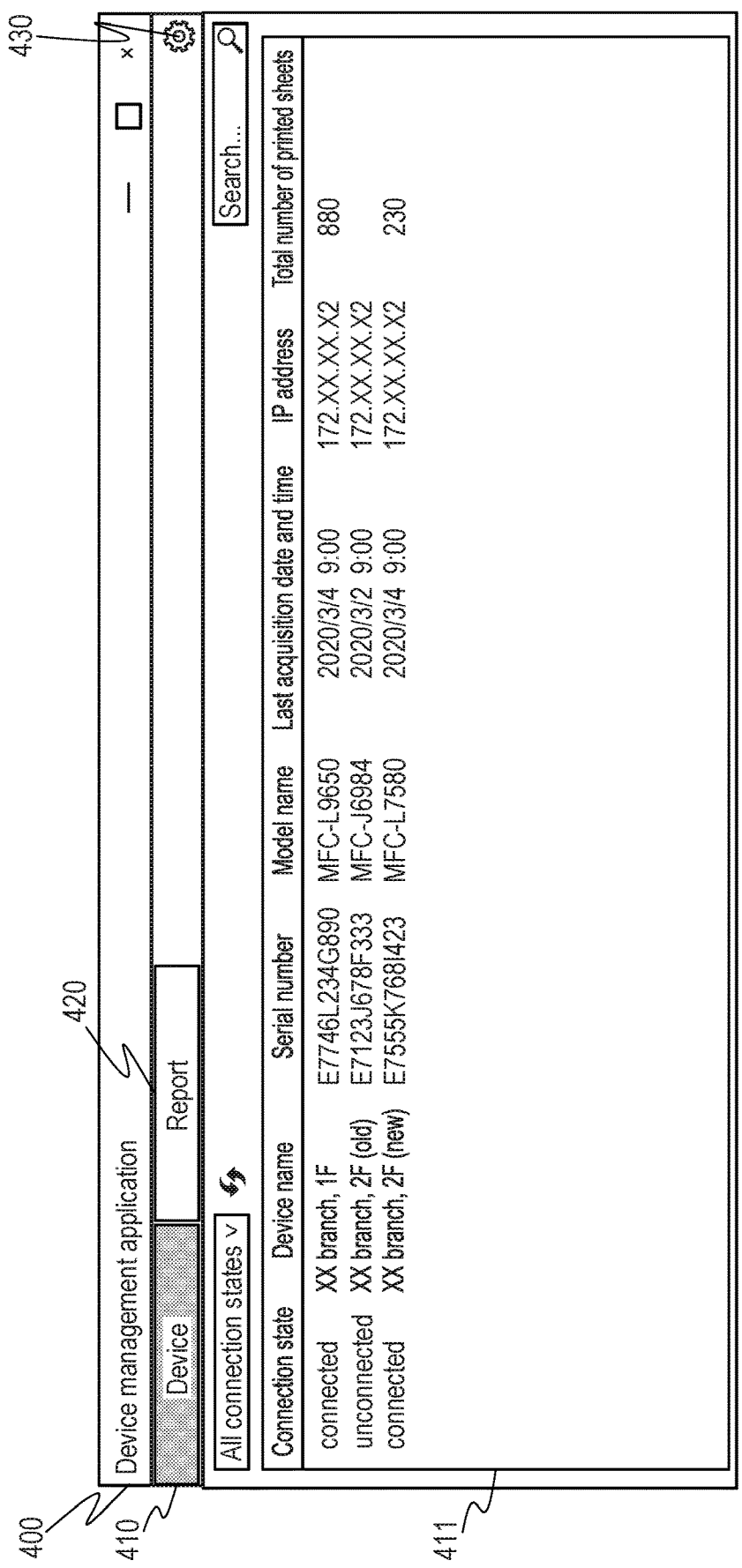

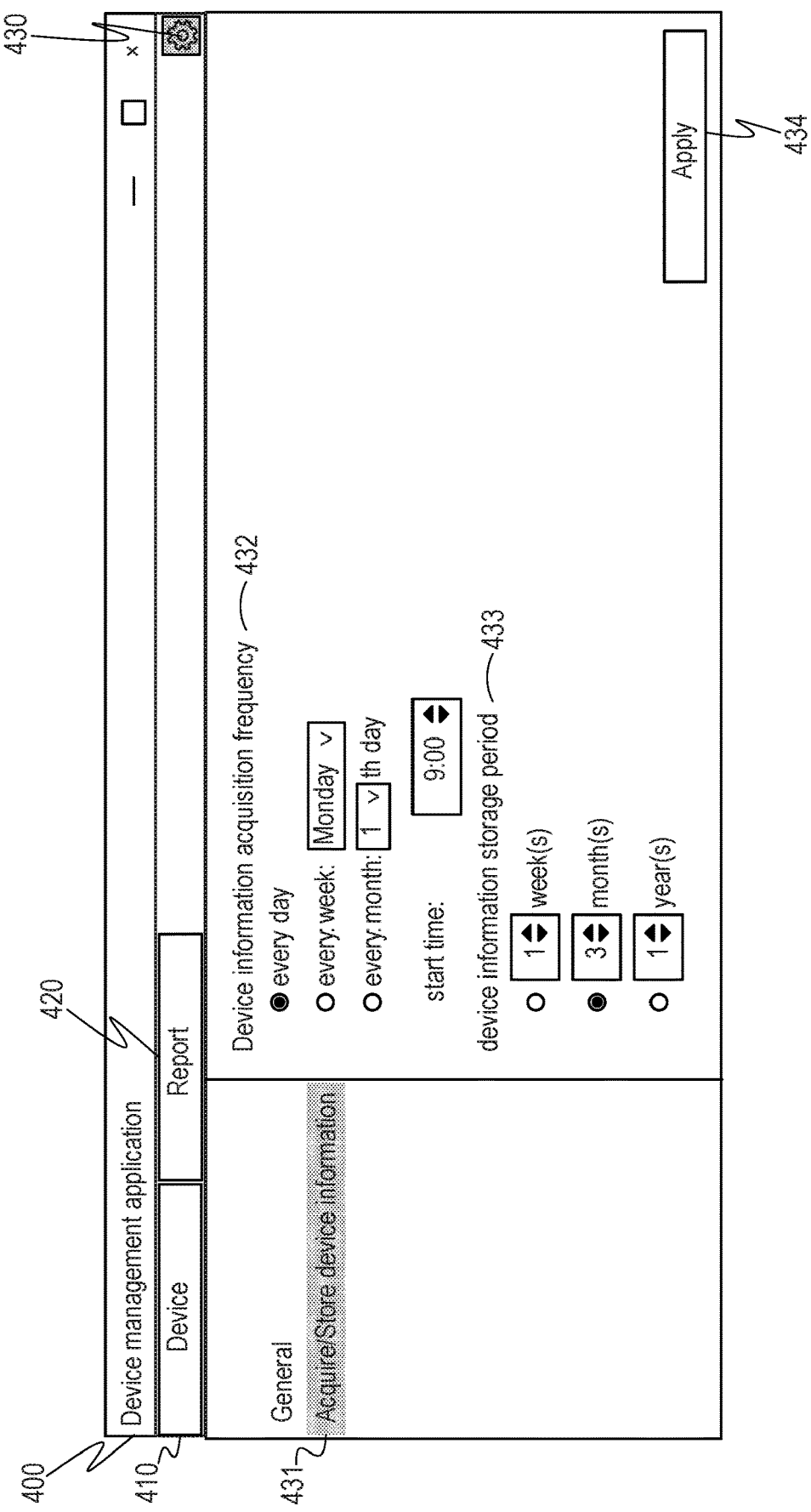

INFORMATION PROCESSING APPARATUS WITH REPORT CREATION ON USAGE STATE OF PRINTING DEVICES, CONTROL METHOD OF INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a control method of the information processing apparatus, and a non-transitory computer-readable storage medium for executing software that acquires and manages device information from a printing device.

Description of the Related Art

In recent years, as a usage form of a printing device such as a printer or a multi-function peripheral (MFP) (hereinafter, referred to as a "device"), subscription contracts have increased under which a user pays a flat rate charge determined in advance and is allowed to use the device for a predetermined period. In general, a subscription contract is made for each device, and the device can be used at a flat rate as long as the upper limit on the number of printed sheets is not exceeded within the period determined under the contract. For example, in a case of a monthly contract, the device can be used at a flat rate as long as the upper limit on the number of printed sheets is not exceeded in a month. The user has to pay an excess charge only when the upper limit on the number of printed sheets is exceeded, and consumable supplies such as a toner are automatically delivered free of charge when the remaining amount becomes small.

Note that, when a device fails and repairment thereof is difficult, the device is replaced with an alternative device, and thereby the service is continued.

Further, to enable the user to select the number or models of installed devices in accordance with a usage state of devices, an application to create a report related to the usage state of the devices is used.

Conventionally, a method of creating a report that takes alternative use of another device in place of a failed device into consideration in a case of a device failure has been proposed.

In Japanese Patent Application Laid-Open No. 2016-66237, in response to detection of a failure, a device whose usage state has negative correlation with the usage state of the failed device is identified and grouped with the failed device as a device used in place of the failed device. Accordingly, a report that enables the user to suitably understand the usage state is created.

When the device was replaced due to a failure or the like, the user' interest is directed not only to the usage state of a device in connection at the time of report output but also to the usage state of a device that was replaced and is not in connection at the time of report output. However, it is not possible to acquire information related to the usage state from the device that was replaced and is no longer connected, and it is not possible to include such information in the report. Thus, it is not possible for the user to understand the usage state of the device that was replaced and is no longer connected at the time of report output.

The present invention has been made to solve the above problem. An object of the present invention is to provide a mechanism that can create a report including not only the usage state of a printing device in connection at the time of report output but also the usage state of a printing device that was replaced and is no longer connected even when the printing device is replaced under a subscription contract or the like.

SUMMARY OF THE INVENTION

The present invention is an information processing apparatus that executes software configured to acquire and manage device information including at least any one of usage information and operation information on a printing device, and the information processing apparatus includes: an acquisition unit that performs an acquisition process to acquire the device information at a predetermined frequency from a printing device connected to a network; a generation unit that generates a list by adding a newly detected printing device in the acquisition process; an accumulation unit that, for a printing device on which the device information is acquired out of printing devices included in the list, accumulates the device information in association with an execution date and time of the acquisition process and, for a printing device on which the device information is not acquired, accumulates information indicating that the printing device on which the device information is not acquired is not in connection in association with the execution date and time of the acquisition process; and a creation unit that creates a report based on the accumulated information for the printing devices included in the list.

According to the present invention, it is possible to create a report including not only the usage state of a printing device in connection at the time of report output but also the usage state of a printing device that was replaced and is no longer connected even when the printing device is replaced under a subscription contract or the like. Accordingly, the user may understand the usage state including the usage state of the printing device that was connected in the past and was replaced and is no longer connected at the time of report output. Further features of the present invention will become apparent from the following description of exemplary embodiments with reference to the attached drawings.

BRIEF DESCRIPTION OF THE DRAWINGS

FIG. 4A is a diagram illustrating an example of a GUI of a device management application of a first embodiment.

FIG. 4C is a diagram illustrating an example of the GUI of the device management application of the first embodiment.

DESCRIPTION OF THE EMBODIMENTS

Embodiments of the present invention will be described below with reference to the drawings.

First Embodiment

System Configuration

Figure 1:
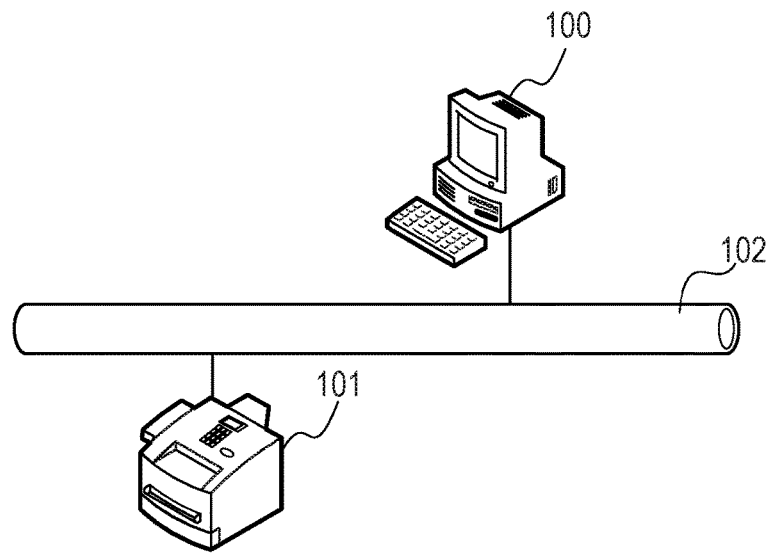
FIG. 1 is a diagram illustrating an overall configuration of a system in the present embodiment.

FIG. 1 is a diagram illustrating an overall configuration of a system in one embodiment of the present invention.

The system of the present embodiment includes a personal computer (PC) 100, a device 101, and a local area network (LAN) 102, and the PC 100 and the device 101 are connected so as to be able to communicate with each other via the LAN 102. The LAN 102 may be wired or wireless.

The PC 100 is an example of an information processing apparatus and has predetermined operating system (OS) (not illustrated) installed therein. Further, a device management application 300 described later is installed in the PC 100. The device management application 300 acquires status information on the device 101 connected to the PC 100 from the device 101 and displays the information on a graphical user interface (GUI) described later of the device management application 300. Note that the status information on the device 101 refers to information such as apparatus status that indicates availability of printing, an occurrence state of warnings and errors, or the like, a remaining amount of each color toner loaded in the device 101, and the number of printed sheets that indicates the cumulative total number of printed sheets that have been printed by the device 101.

The device 101 is an example of an image forming device (printing device) such as a printer or an MFP and may have not only a printing function but also a FAX function, a copying function, a scanner function, or a function such as file transmission. The device 101 performs an output process such as printing in accordance with an instruction from the PC 100. Note that a plurality of devices 101 are connected to the LAN 102 and may be configured to be able to communicate with the PC 100, respectively.

Hardware Configuration of Information Processing Apparatus

Figure 2:
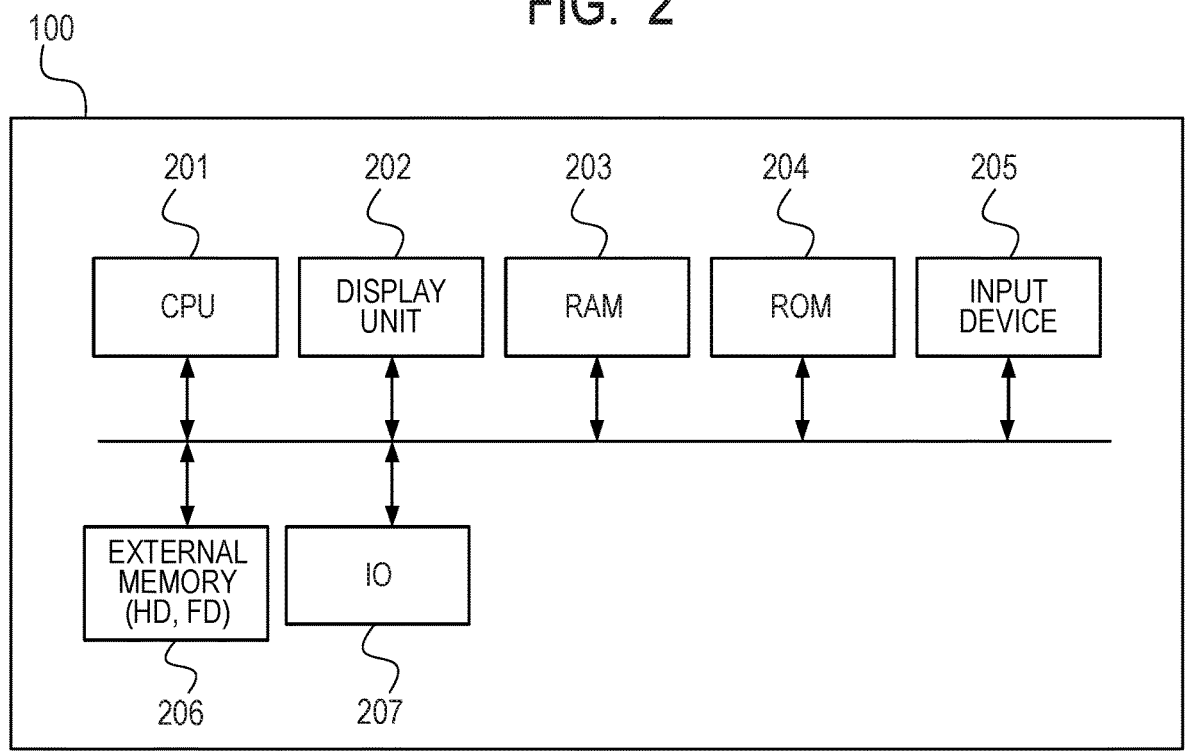
FIG. 2 is a diagram illustrating an example of a hardware configuration of an information processing apparatus (PC).

FIG. 2 is a diagram illustrating an example of a hardware configuration of the PC 100.

As illustrated in FIG. 2, the PC 100 has an input device 205 that receives user operation input, such as a keyboard or a pointing device, and a display unit 202 that provides visual output information feedback to the user.

Further, the PC 100 is provided with storage devices, namely, a RAM 203 that stores various programs or execution information in the present embodiment, an external memory 206 such as a hard disk drive (HDD) or a flexible disk drive (FDD), and a ROM 204.

Furthermore, the PC 100 has an interface device I/O 207 that communicates with an external apparatus and a CPU 201 that executes a program. Note that a form of connection to a peripheral apparatus may be wired or wireless. The PC 100 is connected to the device 101 via the I/O 207.

Software Configuration

Figure 3:
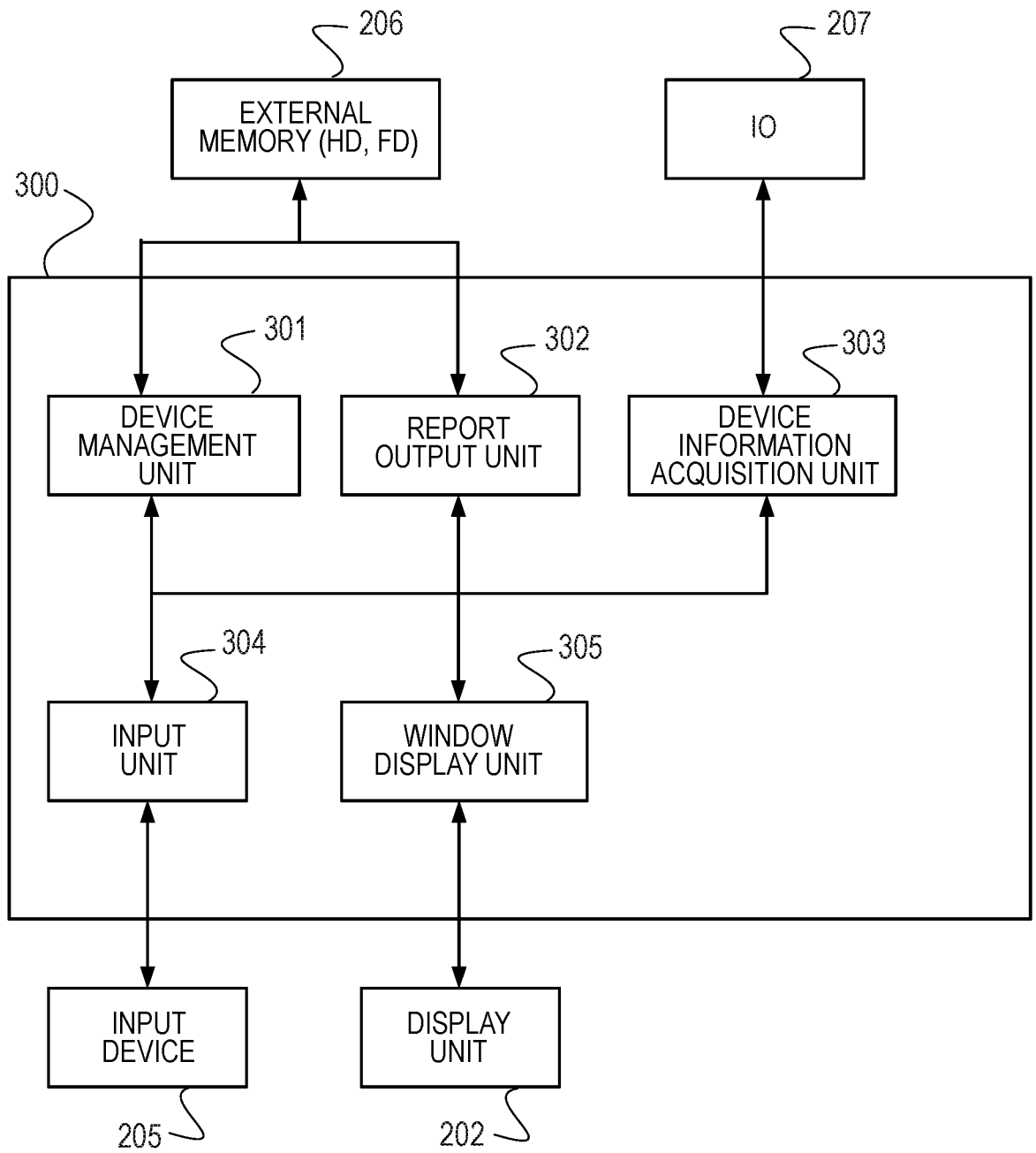
FIG. 3 is a diagram illustrating an example of a software configuration diagram of a device management application.

FIG. 3 is a diagram illustrating an example of a software configuration of a device management application 300 executed in the PC 100. Various units illustrated in FIG. 3 are implemented when the CPU 201 loads a program of the device management application 300 stored in the ROM 204 or the external memory 206 into the RAM 203 and executes the program.

The device management application 300 has a device management unit 301, a report output unit 302, a device information acquisition unit 303, an input unit 304, and a window display unit 305 as the software configuration.

The device management unit 301 manages device information on the device 101 that is a management target of the device management application 300. Herein, the device 101 that is a management target represents a device that is a display target on the device management application 300 and refers to a device in a device list. The device information refers to the device list storing information used for identifying the device and device usage information storing information such as the number of printed sheets and the number of times for use of each function and is stored and managed in the external memory 206 by the device management unit 301.

The report output unit 302 is responsible for a device usage report function in the device management application 300 and creates a device usage report from the device information stored in the external memory 206. The device usage report refers to a report related to the usage state of a device, such as the number of printed sheets of the device in an aggregation period designated by the user. Note that the device usage report is created targeting the device 101 that is a management target of the device management application 300.

The device information acquisition unit 303 detects the device 101 connected on the network and acquires device information. The acquisition of the device information is processed in the following flow, for example.

First, the device information acquisition unit 303 transmits a broadcast packet of simple network management protocol (SNMP) version1 (SNMPv1). The device 101 responds to an SNMPv1 request from the device information acquisition unit 303. The device information acquisition unit 303 additionally acquires device information used in the device management application 300 for the device 101 from which the response has been returned. Further, for the device 101 managed in the device list by the device management unit 301, the device information acquisition unit 303 regularly acquires device information including the number of printed sheets of the device machine and stores the device information via the device management unit 301. Note that the acquisition of the device information may be configured to be performed by using any other schemes than the above. For example, the device information acquisition unit 303 may be notified of device information from the device side. Alternatively, another server (not illustrated) that manages the device may collect the device information, and the device information acquisition unit 303 may acquire the device information via the server.

The input unit 304 detects a user operation performed on the input device 205 via a GUI of the device management application 300 displayed by the window display unit 305 and acquires user operation information.

The window display unit 305 performs window display control such as displaying a GUI of the device management application 300 or accepting the user operation performed on a GUI.

GUI of Device Management Application

Figure 4B:
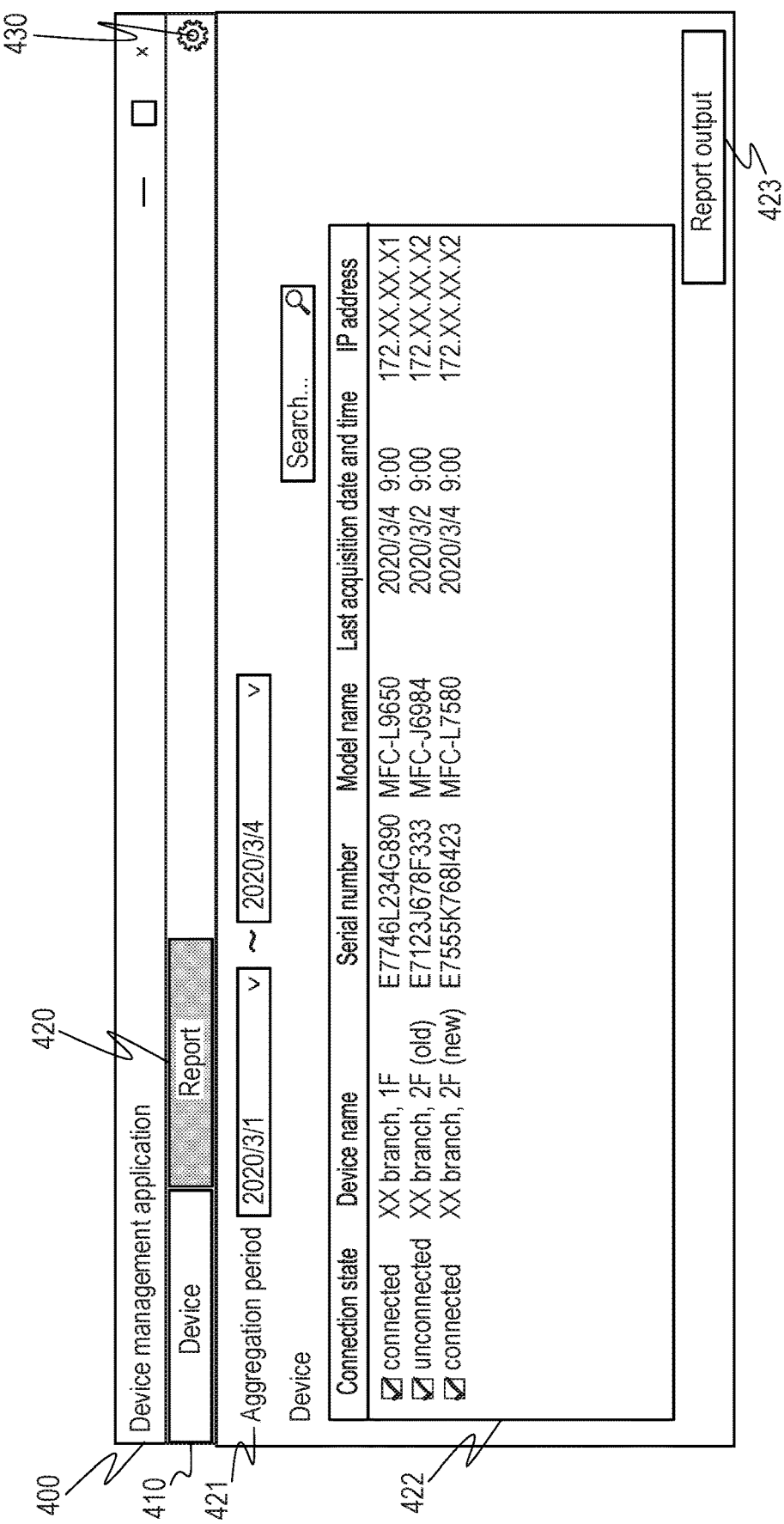
FIG. 4B is a diagram illustrating an example of the GUI of the device management application of the first embodiment.

FIG. 4A to FIG. 4C are diagrams each illustrating an example of a GUI 400 of the device management application 300 of the first embodiment.

The GUI 400 is displayed on the display unit 202 by the window display unit 305.

Once the input unit 304 detects a user operation performed on the input device 205, the input unit 304 passes the user operation information to the window display unit 305, and the window display unit 305 displays, on the display unit 202, the GUI 400 in accordance with the user operation information.

On the GUI 400, information on the device list managed by the device management application 300, an entry window used for designating the target and outputting the device usage report, an entry window used for changing the setting of the device management application 300, or the like are displayed.

As illustrated in FIG. 4A, in response to selection of a device tab 410, the window display unit 305 displays information on the device list managed by the device management unit 301 of the device management application 300 on a device list display part 411 of the GUI 400. Details of the device list will be described later.

In the device list display part 411, the device connection state, a device name, a serial number, a model name, a last acquisition date and time, an IP address, and the total number of printed sheets are displayed for each device managed by the device management unit 301.

In response to selection of a report tab 420, the window display unit 305 displays a report output window as with FIG. 4B on the GUI 400. In the report output window, designation of a report aggregation period is accepted in an aggregation period designation part 421. Further, selection of a device targeted for report output is accepted in a target device selection part 422. In the target device selection part 422, all the devices in the device list including a device that is not in connection at the time of selection are displayed as options, and a device that is not in connection at the time of selection can also be selected as an output target of the report. In response to a click on the report output button 423, the report output unit 302 outputs the report of the device designated in the target device selection part 422.

In response to selection of a setting button 430, the window display unit 305 displays an entry window as with FIG. 4C used for changing the setting of the device management application 300 on the GUI 400. Further, in this entry window, in response to selection of a device information acquisition/storage setting part 431, the window display unit 305 displays an entry window used for changing the setting of the device information acquisition/storage. After the user inputs the acquisition frequency of the device information in a device information acquisition frequency setting part 432 and inputs a storage period of the device information in a device information storage period setting part 433, the device management unit 301 reads the input setting in response to a click on a setting apply button 434. The device management unit 301 stores the read setting in the external memory 206 as a device information acquisition/storage setting file.

The device information acquisition/storage setting file is read by the device management unit 301 at the time of start of the device management application 300. The device management unit 301 performs acquisition/storage of the device information at an acquisition frequency of the device information read from the device information acquisition/storage setting file. Further, the device management unit 301 references the storage period of the device information read from the device information acquisition/storage setting file to perform deletion of the device usage information for which the storage period has elapsed.

Data Structure (Device List)

Table 1 illustrates an example of the data structure of the device list managed by the device management application 300.

TABLE 1

| Device ID | Device name | Model name | Serial number | Last acquisition date and time | IP address |
|---|---|---|---|---|---|
| Dev00001 | XX branch, 1F | MFC-L9650 | E7746L234G890 | 2020/3/4 9:00 | 172.XX.XX.X1 |
| Dev00002 | XX branch, 2F (old) | MFC-J6984 | E7123J678F333 | 2020/3/2 9:00 | 172.XX.XX.X2 |
| Dev00003 | XX branch, 2F (new) | MFC-L7580 | E7555K768I423 | 2020/3/4 9:00 | 172.XX.XX.X2 |

In the device list, each record represents a single device and includes information on a device ID, a device name, a model name, a serial number, a last connection date and time, an IP address, or the like.

The device ID is an ID allocated to a pair of the model name and the serial number, and an individual device can be identified by the value of the ID. The device name is any name that can be set by the user for each device. The device name can be changed via the GUI of the device management application or the GUI of the device. The model name indicates a model name of the device and uniquely indicates the type of the device. The serial number is a number allocated to an individual device and is not duplicated with a serial number allocated to another device having the same model name. The last connection date and time indicates the last date and time when the device information acquisition unit confirmed that the device was in connection and acquired the device information. The IP address is an IP address allocated to the device and indicates an IP address of the device in the last acquisition of device information.

The device list is stored in a comma-separated values (CSV) format in the external memory 206 of the PC 100. In addition, the device list may be stored as a JavaScript object notation (JSON)-format file or an extensible markup language (XML)-format file or may be stored in an external database (not illustrated). The storage method and the storage format of the device list are not particularly limited.

Date Structure (Device Usage Information)

Table 2 illustrates an example of the data structure of device usage information managed by the device management application 300.

TABLE 2

| Device ID | Acquisition date and time | Connection state | IP address | Total number of printed sheets |
|---|---|---|---|---|
| Dev00001 | 2020/3/1 9:00 | Connected | 172.XX.XX.X1 | 550 |
| Dev00001 | 2020/3/2 9:00 | Connected | 172.XX.XX.X1 | 630 |
| Dev00001 | 2020/3/3 9:00 | Connected | 172.XX.XX.X1 | 750 |
| Dev00001 | 2020/3/4 9:00 | Connected | 172.XX.XX.X1 | 880 |
| Dev00002 | 2020/3/1 9:00 | Connected | 172.XX.XX.X2 | 2540 |
| Dev00002 | 2020/3/2 9:00 | Connected | 172.XX.XX.X2 | 2780 |
| Dev00002 | 2020/3/3 9:00 | Unconnected | | |
| Dev00002 | 2020/3/4 9:00 | Unconnected | | |
| Dev00003 | 2020/3/3 9:00 | Connected | 172.XX.XX.X2 | 20 |
| Dev00003 | 2020/3/4 9:00 | Connected | 172.XX.XX.X2 | 230 |

The device usage information includes a device ID, a connection state, an IP address, the total number of printed sheets, or the like and is additionally stored every time the device information collection is performed.

The device ID corresponds to the device ID in the device list illustrated in Table 1 and uniquely identifies a device. The connection state indicates whether or not the device was in connection to the network at the time of device information collection. The acquisition date and time indicates a date and time when a device information acquisition process was performed. The IP address indicates an IP address of the device if the device is in connection to the network at the time of device information collection. If the device is not in connection to the network at the time of device information collection, the field of a value of the IP address is blank. The total number of printed sheets indicates the total number of printed sheets of the device included in the device information if the device is in connection to the network at the time of device information collection. If the device is not in connection to the network at the time of device information collection, the field of a value of the total number of printed sheets is blank.

The device usage information is stored in the CSV format in the external memory 206 of the PC 100. In addition, the device usage information may be stored as a JSON-format file or an XML-format file. Further, the device usage information may be stored in an external database (not illustrated). The storage method and the storage format of the device usage information are not particularly limited.

Device Usage Report

Table 3 illustrates an example of the device usage report output by the report output unit 302.

TABLE 3

| Device ID | Device name | Model name | Serial number | First acquisition date and time in aggregation period | Last acquisition date and time in aggregation period | Increment of total number of printed sheets |
|---|---|---|---|---|---|---|
| Dev00001 | XX branch, 1F | MFC-L9650 | E7746L234G890 | 2020/3/1 9:00 | 2020/3/4 9:00 | 330 |
| Dev00002 | XX branch, 2F (old) | MFC-J6984 | E7123J678F333 | 2020/3/1 9:00 | 2020/3/2 9:00 | 240 |
| Dev00003 | XX branch, 2F (new) | MFC-L7580 | E7555K768I423 | 2020/3/3 9:00 | 2020/3/4 9:00 | 210 |

The device usage report includes information such as a device ID, a device name, a model name, a serial number, a start date and time of an aggregation period, an end date and time of the aggregation period, an increment of the total number of printed sheets, or the like.

The device ID, the device name, the model name, and the serial number are acquired from the device list illustrated in Table 1 in accordance with selection in the target device selection part 422. The first acquisition date and time in an aggregation period and the last acquisition date and time in the aggregation period indicate the first acquisition date and time of device usage information and the last acquisition date and time of device usage information on a device in a connected state in the aggregation period designated on a GUI 421 of the device management application 300. The increment of the total number of printed sheets indicates a difference between the first acquired total number of printed sheets and the last acquired total number of printed sheets in an aggregation period designated on the GUI 421 of the device management application 300.

The device usage report is stored in the CSV format in the external memory 206 of the PC 100. The storage method and the storage format of the device usage report are not particularly limited.

Execution Process of Device Information Collection

Figure 5:
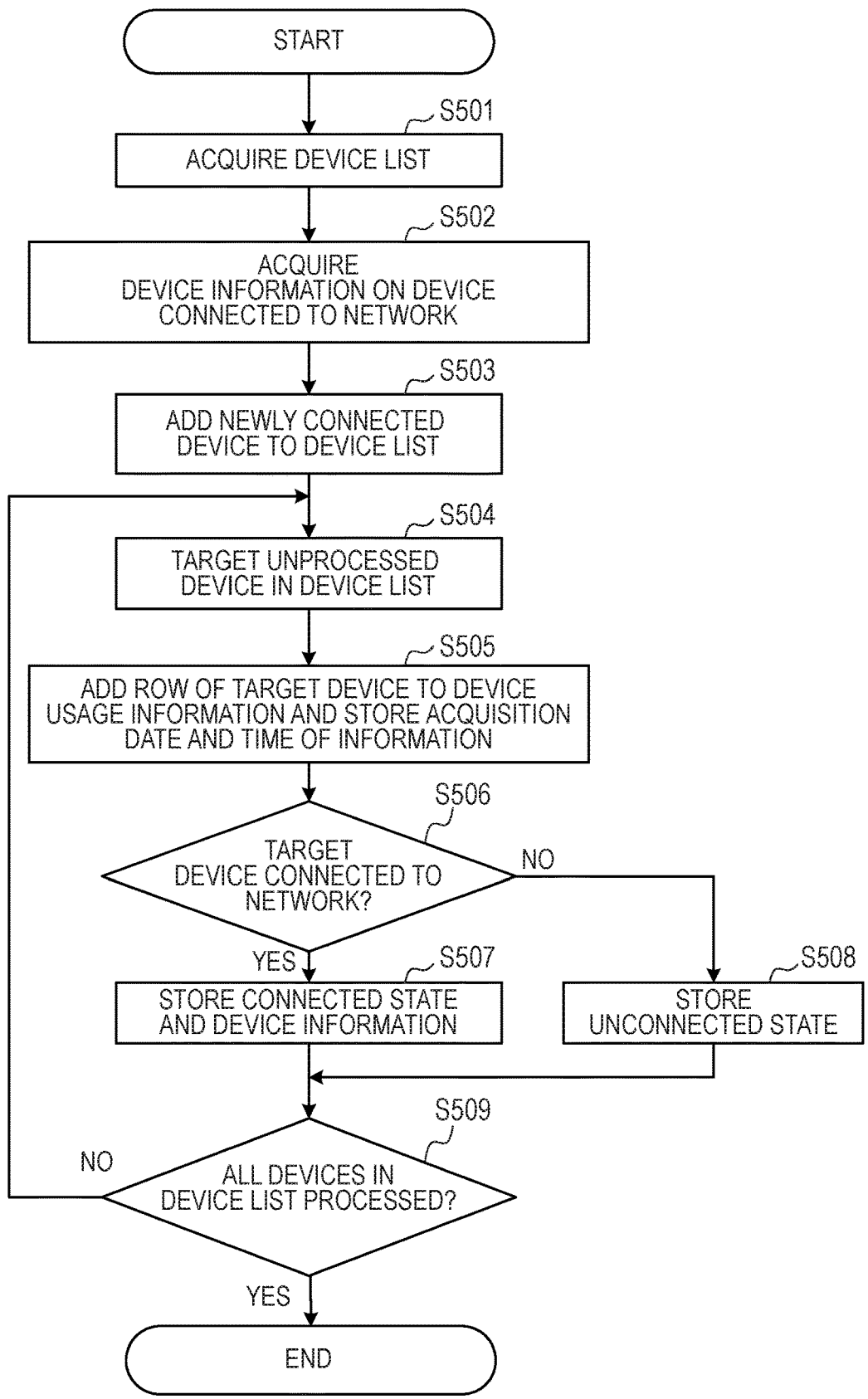
FIG. 5 is a flowchart illustrating an example of an execution process procedure of device information collection.

FIG. 5 is a flowchart illustrating an example of an execution process procedure of device information collection performed by the device management application 300. This example illustrates a process to perform device information collection for all the devices in the device list illustrated in Table 1 in accordance with a frequency of information collection set by the user on a GUI 432 of the device management application 300 illustrated in FIG. 4C.

Note that the processes of the flowcharts illustrated in FIG. 5 and FIG. 6 described later are implemented when the CPU 201 loads a program of the device management application 300 stored in the ROM 204 or the external memory 206 into the RAM 203 and executes the program.

In S501, the device management unit 301 of the device management application 300 reads a device list stored in the external memory 206.

Next, in S502, the device management unit 301 instructs the device information acquisition unit 303 to acquire device information. The instructed device information acquisition unit 303 acquires information such as a device name, a model name, a serial number, an IP address, the total number of printed sheets, or the like from all the devices on the network (device information acquisition process).

Next, in S503, the device management unit 301 receives the device information acquired by the device information acquisition unit 303 and compares the acquired device information with the device list acquired in S501 described above. Then, if the device information includes information on a device not present in the device list, the information on the device is added to the device list.

Next, in S504, the device management unit 301 selects one device which has not performed the process of S504 to S508 as a target device out of the device list.

Next, in S505, the device management unit 301 adds a row of the target device to the device usage information and stores the acquisition date and time of the information (execution date and time of the device information acquisition process (S502)).

Next, in S506, the device management unit 301 determines whether or not the target device is connected to the network. This determination is to check whether or not information on the target device is included in the device information received in S503 described above and determine that the target device is in connection if the information thereon is included or determine that the target device is not in connection if the information thereon is not included.

If the target device is in connection to the network (S506, Yes), the device management unit 301 proceeds with the process to S507.

In S507, the device management unit 301 additionally stores information indicating that the target device is in a "connected state" and the device information on the target device in the device usage information and proceeds with the process to S509.

In contrast, if the target device is not in connection to the network (S506, No), the device management unit 301 proceeds with the process to S508.

In S508, the device management unit 301 additionally stores information indicating that the target device is an "unconnected state" in the device usage information and proceeds with the process to S509.

In S509, the device management unit 301 checks whether or not the process of S504 to S508 has been performed on all the devices in the device list. If there is an unprocessed device (S509, No), the device management unit 301 returns the process to S504 and performs the process of S504 and the subsequent steps.

In contrast, if the process of S504 to S508 has been performed on all the devices (S509, Yes), the device management unit 301 ends the process of this flowchart.

With the above process, after a device newly connected to the network is added to a device list, device information on all the devices in the device list can be acquired. At this time, for a device on which the device information has been acquired, information indicating that the device is in a "connected" state and the acquired device information are added to the device usage information. On the other hand, for a device on which the device information has not been acquired, information indicating that the device is in an "unconnected" state is added to the device usage information. This makes it possible to generate a device list and device usage information on a device that has been connected at least once in the past.

Execution Process of Device Usage Report Output

Figure 6:
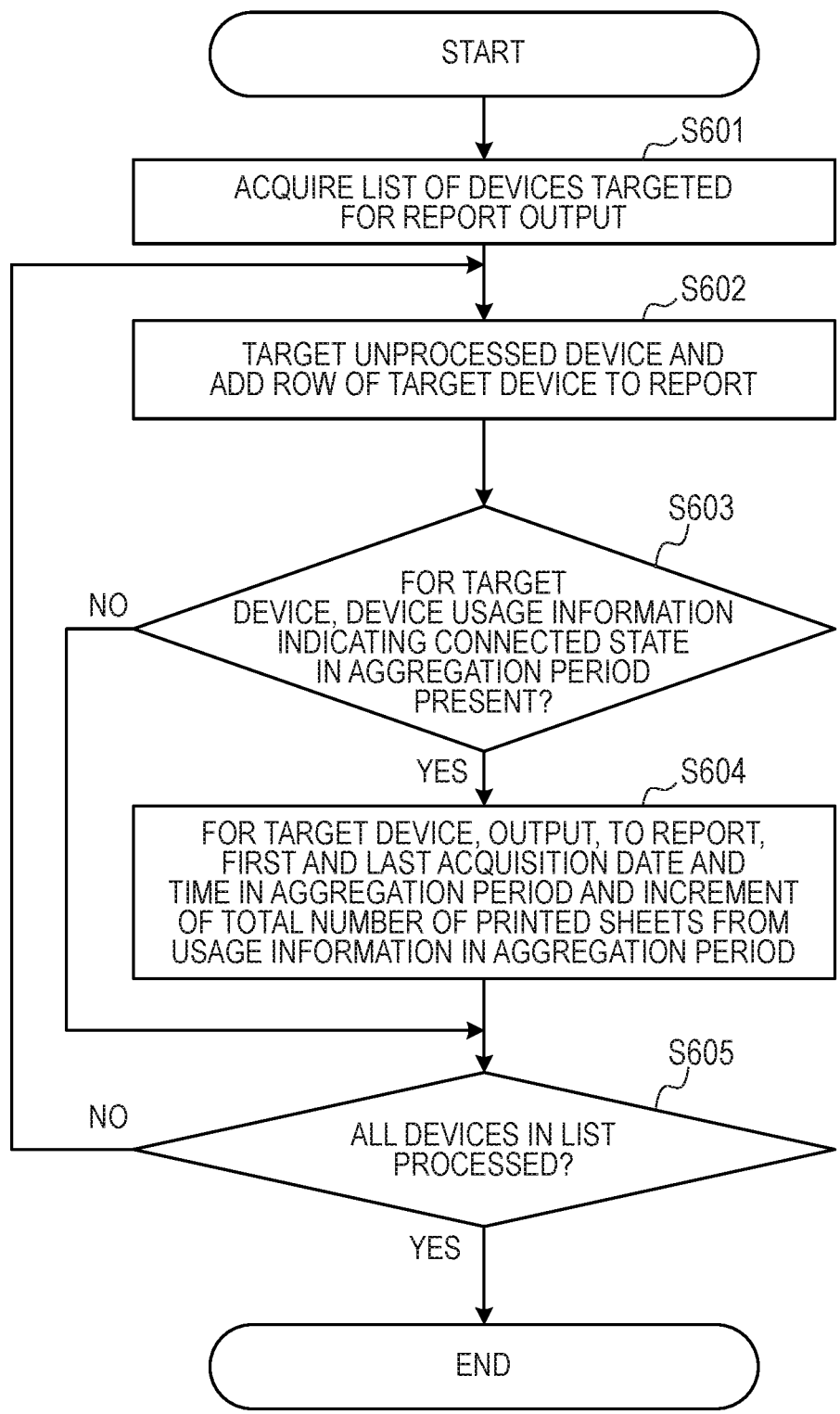
FIG. 6 is a flowchart illustrating an example of an execution process procedure of device usage report output of the first embodiment.

FIG. 6 is a flowchart illustrating an example of an execution process procedure of device usage report output performed by the device management application 300 of the first embodiment. This example illustrates a process to output a device usage report illustrated in Table 3 from the device usage information illustrated in Table 2 in the aggregation period for a device designated by the user on the GUI 400 of the device management application 300 as with FIG. 4B. After a target of a report is designated in the aggregation period designation part 421 and the target device selection part 422, in response to accepting a user operation on the report output button 423, the input unit 304 notifies the device management unit 301 that the user operation has been accepted. In response to this notification, the device management unit 301 starts the device usage report output process in FIG. 6.

First, in S601, the device management unit 301 acquires a list of devices selected in the target device selection part 422 and instructs the report output unit 302 to output a device usage report for an aggregation period designated in the aggregation period designation part 421.

In S602, the report output unit 302 selects one device which has not performed the process of S602 to S604 as a target device out of the list of devices targeted for report output and adds a row of the target device to the device usage report.

In S603, the report output unit 302 checks device usage information in the aggregation period for the target device. If there is device usage information on a device in a connected state in the aggregation period for the target device (S603, Yes), the report output unit 302 proceeds with the process to S604.

In S604, the report output unit 302 acquires the first acquisition date and time and the last acquisition date and time in the aggregation period from the device usage information in the aggregation period for the target device and outputs the acquired date and time to the row of the target device of the report. Further, the report output unit 302 outputs a difference between the first acquired total number of printed sheets and the last acquired total number of printed sheets in the aggregation period to the row of the target device of the report as the increment of the total number of printed sheets and proceeds with the process to S605.

In contrast, if there is no device usage information on a device in a connected state in the aggregation period for the target device (S603, No), the report output unit 302 proceeds with the process to S605.

In S605, the report output unit 302 checks whether or not the process of S602 to S604 has been performed on all the devices in the list of devices targeted for report output. If there is an unprocessed device (S605, No), the report output unit 302 returns the process to S602 and performs the process of S602 and the subsequent steps.

In contrast, if the process of S602 to S604 has been performed on all the devices in the list of devices targeted for report output (S605, Yes), the report output unit 302 ends the process of this flowchart.

With the above process, for a device designated by the user, a device usage report in an aggregation period can be output regardless of the connection state of the device at the time of report output. That is, it is possible to create a report including not only the usage state of a device in connection at the time of report output but also the usage state of a device that was replaced and is no longer connected. This enables the user to understand the usage state of devices including the usage state of a device that was connected in the past but was replaced and is no longer connected at the time of report output.

Second Embodiment

In the first embodiment, the configuration in which a report about information on a counter or the like is output as a history also for an unconnected device has been described. Note that, if which device the unconnected device was replaced with can be understood from report output, this can further improve usability. Thus, in the second embodiment, a configuration in which a device replaced from and a device replaced with are grouped as devices of the same group and a report is output collectively for devices of the same group will be described.

GUI of Device Management Application

Figure 7A:
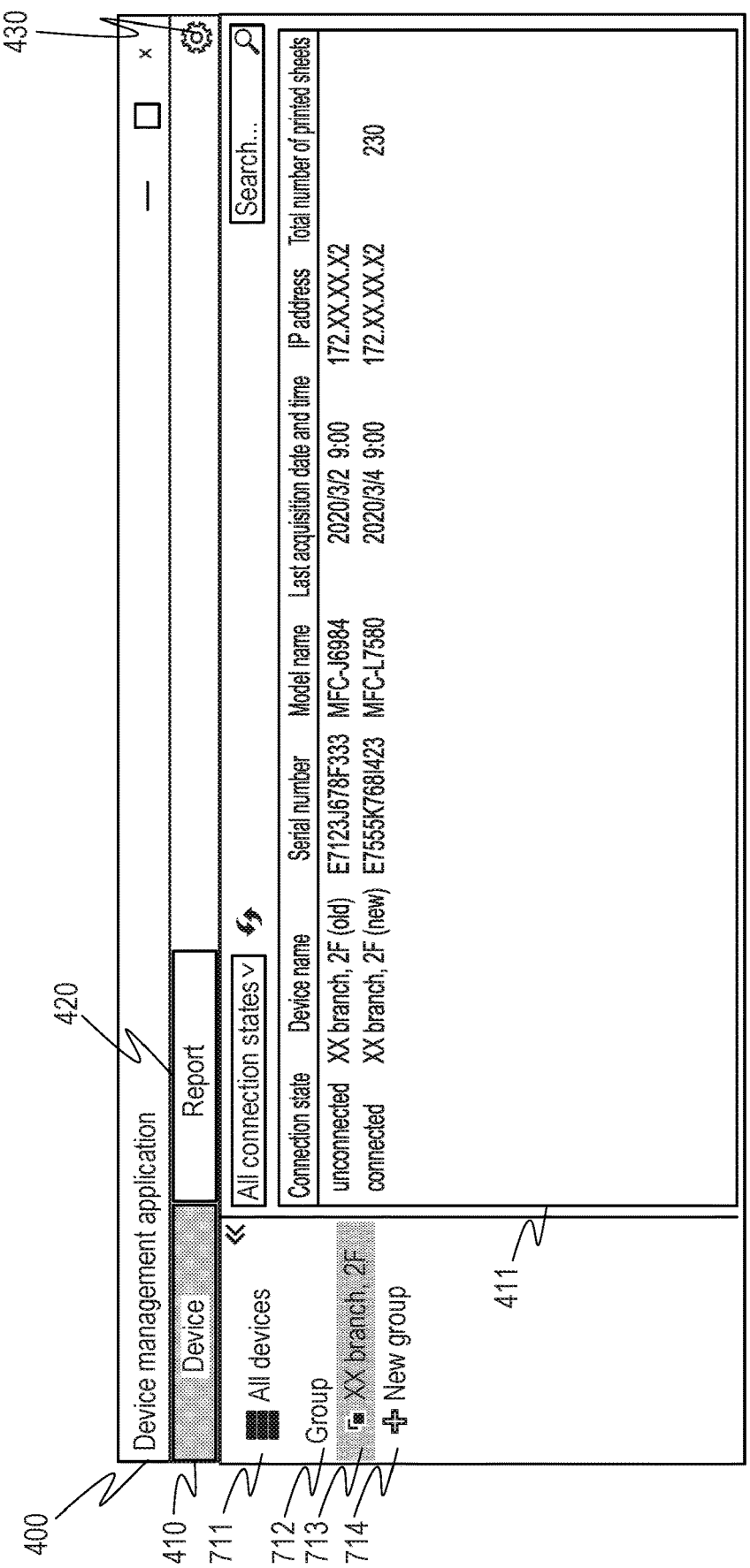
FIG. 7A is a diagram illustrating an example of a GUI of a device management application of a second embodiment.
Figure 7B:
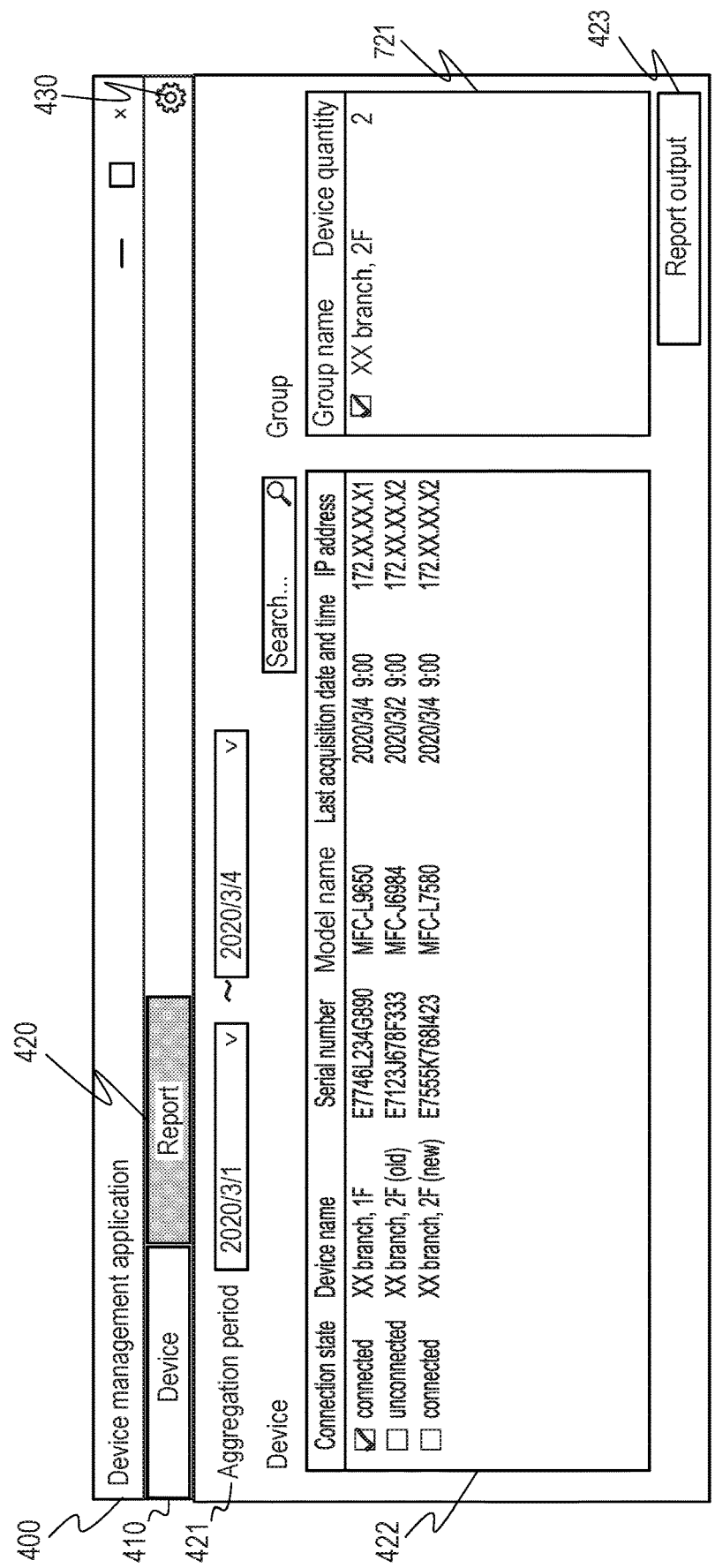
FIG. 7B is a diagram illustrating an example of the GUI of the device management application of the second embodiment.

FIG. 7A and FIG. 7B are diagrams each illustrating an example of the GUI 400 of the device management application 300 of the second embodiment.

On the GUI 400, information on a device list or a group managed by the device management application 300, an entry window used for designating a target and outputting a device usage report, an entry window used for changing the setting of the device management application 300, and the like are displayed. Differences from the first embodiment will be described below, and description for the same configuration will be omitted.

In response to selection of the device tab 410, the window display unit 305 displays an all-device display button 711, a group list 712, and a group creation button 714 on the GUI 400 as illustrated in FIG. 7A. When the all-device display button 711 is selected, device information on all the devices in the device list is displayed in the device list display part 411 in the same manner as FIG. 4A.

In response to selection of a group 713 from the group list 712, the window display unit 305 displays device information on devices included in the group 713 in the device list display part 411.

Further, selection of the group creation button 714 enables creation of a new group composed of devices in the device list. Herein, since a device not in connection at the time of group creation is also included in the device list, a group composed of devices before and after replacement can be created. The creation of a group is performed by the device management unit 301, for example.

In response to selection of the report tab 420, the window display unit 305 displays a report output window as with FIG. 7B on the GUI 400. In the report output window, designation of a report aggregation period is accepted in the aggregation period designation part 421. Further, selection of a device targeted for report output is accepted in the target device selection part 422, and selection of a group targeted for report output is accepted in a target group selection part 721. In response to a click on the report output button 423, the report output unit 302 outputs a report on the device designated in the target device selection part 422 and a group designated in the target group selection part 721.

Data Structure (Group Information)

Table 4 illustrates an example of the data structure of group information managed by the device management application 300.

TABLE 4

| Group ID | Group name | Device ID |
|---|---|---|
| Grp00001 | XX branch, 2F | Dev00002 |
| Grp00001 | XX branch, 2F | Dev00003 |

The group information has a group ID, a group name, and a device ID.

The group ID is an ID allocated to each group at the time of group creation, and a group can be identified by the value of the ID. The group name is a name that can be set by the user for each group. The group name can be changed via the GUI 400 of the device management application. The device ID is a device ID of a device included in a group and corresponds to the device ID in the device list illustrated in Table 1.

The group information is stored in the CSV format in the external memory 206 of the PC 100. In addition, the group information may be stored as a JSON-format file or an XML-format file or may be stored in an external database (not illustrated). The storage method and the storage format of the group information are not particularly limited.

Device Usage Report

Table 5 illustrates an example of the device usage report output by the report output unit 302. Differences from the first embodiment will be described below.

TABLE 5

| Group/ Device ID | Group/ Device name | Model name | Serial number | First acquisition date and time in aggregation period | Last acquisition date and time in aggregation period | Increment of total number of printed sheets |
|---|---|---|---|---|---|---|
| Dev00001 | XX branch, 1F | MFC-L9650 | E7746L234G890 | 2020/3/1 9:00 | 2020/3/4 9:00 | 330 |
| Grp00001 | XX branch, 2F | | | 2020/3/1 9:00 | 2020/3/4 9:00 | 450 |
| Grp00001\|Dev00002 | XX branch, 2F (old) | MFC-J6984 | E7123J678F333 | 2020/3/1 9:00 | 2020/3/2 9:00 | 240 |
| Grp00001\|Dev00003 | XX branch, 2F (new) | MFC-L7580 | E7555K768I423 | 2020/3/3 9:00 | 2020/3/4 9:00 | 210 |

The device usage report includes information on a group/device ID, a group/device name, a model name, a serial number, a start date and time of an aggregation period, an end date and time of an aggregation period, an increment of the total number of printed sheets, or the like. Each record represents any of a group selected in the target group selection part 721, a device included in a group selected in the target group selection part 721, and a device selected in the target device selection part 422.

The group/device ID indicates a group ID, a device ID, or a value combining a group ID and a device ID. For a group selected in the target group selection part 721, a group ID is output ("Grp00001" in the example of Table 5). For a device selected in the target device selection part 422, a device ID is output ("Dev00001" in the example of Table 5).

For a device included in a group selected in the target group selection part 721, a value combining a group ID and a device ID is output ("Grp00001|Dev00002" or "Grp00001|Dev00003" in the example of Table 5).

The group/device name indicates a group name or a device name. For a group selected in the target group selection part 721, a group name is output ("XX branch, 2F" in the example of Table 5). For a device selected in the target device selection part 422, a device name is output ("XX branch, 1F" in the example of Table 5). For a device included in a group selected in the target group selection part 721, a device name is output ("XX branch, 2F (old)" or "XX branch, 2F (new)" in the example of Table 5).

For a group selected in the target group selection part 721, the fields of a model name and a serial number are blank. As the first acquisition date and time in an aggregation period and the last acquisition date and time in an aggregation period, the first date and time and the last date and time are output from the first acquisition date and time in an aggregation period and the last acquisition date and time in the aggregation period for a device included in a group, respectively. As the increment of the total number of printed sheets, a sum of increments of the total number of printed sheets for a device included in a group is output. In the example of Table 5, a sum "450" of an increment "240" of the total number of printed sheets for "Dev00002" and an increment "210" of the total number of printed sheets for "Dev00003" is output as the increment of the total number of printed sheets for "Grp00001".

Execution Process of Device Usage Report Output

Figure 8:
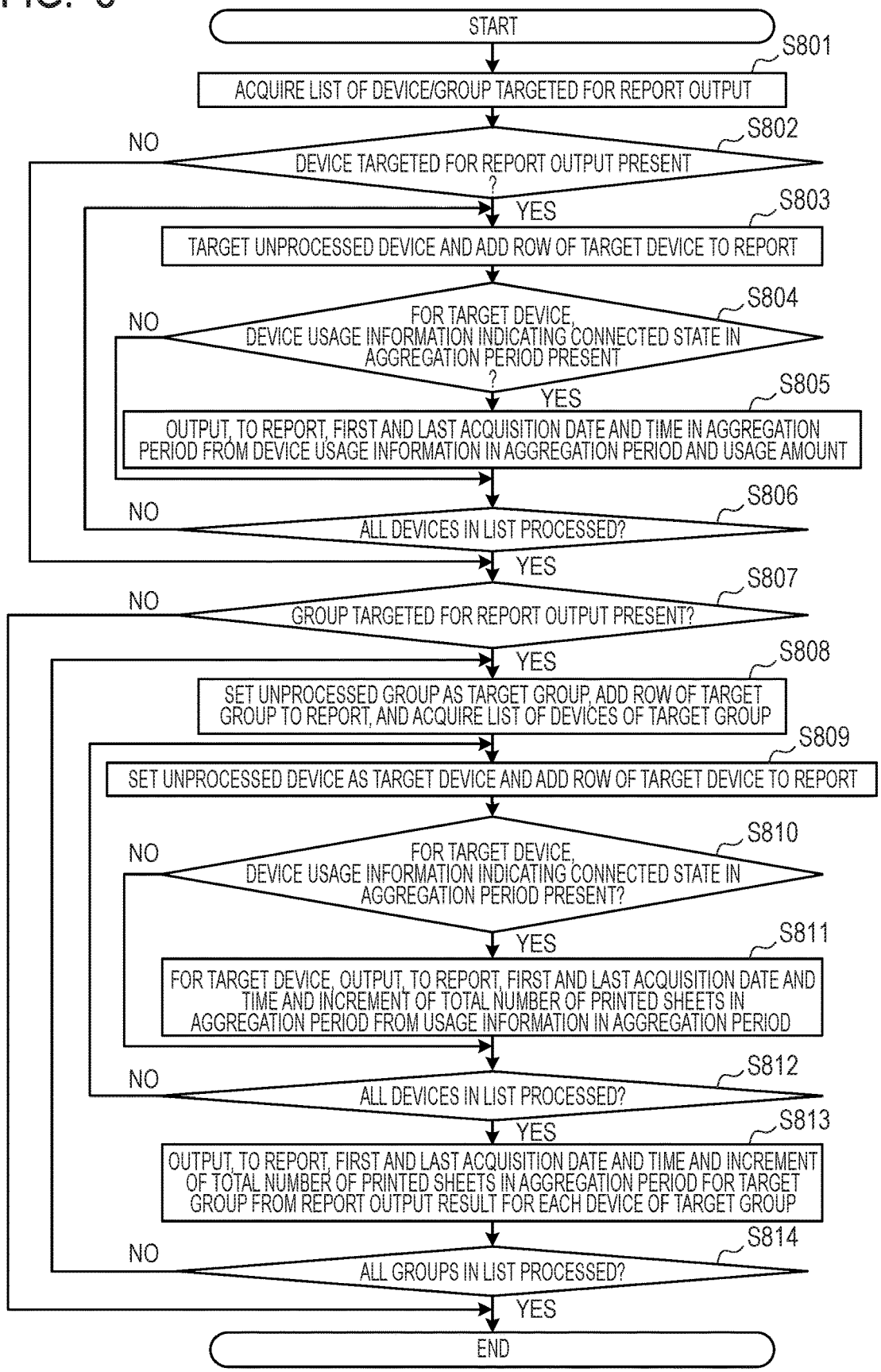
FIG. 8 is a flowchart illustrating an example of an execution process procedure of device usage report output of the second embodiment.

FIG. 8 is a flowchart illustrating an example of an execution process procedure of device usage report output performed by the device management application 300 of the second embodiment. This example illustrates a process to output a device usage report illustrated in Table 5 from the device usage information illustrated in Table 2 in an aggregation period for a device/group designated by the user on the GUI 400 of the device management application 300 as with FIG. 7B. After a target for a report is designated in the aggregation period designation part 421, the target device selection part 422, and the target group selection part 721, in response to accepting a user operation via the report output button 423, the input unit 304 notifies the device management unit 301 that the user operation has been accepted. In response to this notification, the device management unit 301 starts a device usage report output process of FIG. 8. Note that the process of the flowchart illustrated in FIG. 8 is implemented when the CPU 201 loads a program of the device management application 300 stored in the ROM 204 or the external memory 206 into the RAM 203 and executes the program.

First, in S801, the device management unit 301 acquires a list of devices/groups selected in the target device selection part 422 and the target group selection part 721. Furthermore, the device management unit 301 passes the acquired list to the report output unit 302 and instructs the report output unit 302 to output a device usage report for an aggregation period designated in the aggregation period designation part 421.

Next, in S802, the report output unit 302 checks whether or not a device is included in the received list of devices/groups. If no device is included (S802, No), the report output unit 302 proceeds with the process to S807.

In contrast, if a device is included in the received list of devices/groups (S802, Yes), the report output unit 302 proceeds with the process to S803. Note that, since the process of S803 to S806 is the same as the process of S602 to S605 of FIG. 6, the description thereof will be omitted.

In S807, the report output unit 302 checks whether or not a group is included in the received list of devices/groups. If no group is included (S807, No), the report output unit 302 ends the process of this flowchart.

In contrast, if a group is included in the received list of devices/groups (S807, Yes), the report output unit 302 proceeds with the process to S808.

In S808, the report output unit 302 selects one group which has not performed the process of S808 to S813 as a target group from the list of groups targeted for report output and acquires the device list of the target group.

Next, in S809, the report output unit 302 selects an unprocessed device as a target from a device list of the target group and adds a row of the target device of the target group to the device usage report.

Next, in S810, the report output unit 302 checks whether or not there is device usage information on a device in a connected state in the aggregation period for the target device. Then, if there is device usage information on a device in a connected state in the aggregation period (S810, Yes), the report output unit 302 proceeds with the process to S811.

In S811, the report output unit 302 acquires the first acquisition date and time and the last acquisition date and time in the aggregation period from the device usage information in the aggregation period and outputs the acquired first acquisition date and time and the acquired last acquisition date and time to the row of the target device of the target group in the report. Further, the report output unit 302 outputs a difference between the first acquired total number of printed sheets and the last acquired total number of printed sheets in the aggregation period to the row of the target device of the target group in the report as an increment of the total number of printed sheets. After S811, the report output unit 302 proceeds with the process to S812.

In contrast, if there is no device usage information on a device in a connected state in the aggregation period (S810, No), the report output unit 302 proceeds with the process to S812.

In S812, the report output unit 302 checks whether or not the process of S809 to S811 has been performed on all the devices in the device list of the target group. If there is an unprocessed device (S812, No), the report output unit 302 returns the process to S809 and performs the process of S809 and the subsequent steps.

In contrast, if the process of S809 to S811 has been performed on all the devices in the device list of the target group (S812, Yes), the report output unit 302 proceeds with the process to S813.

In S813, the report output unit 302 finds the increment of the total number of printed sheets of the target group from the report output result for each device of the target group and outputs the found increment to the row of the target group in the report. That is, the value that is a sum of the increments of the total number of printed sheets for respective devices of the target group is output to the report as the increments of the total number of printed sheets of the group.

In S814, the report output unit 302 checks whether or not the process of S808 to S813 has been performed on all the groups in the list of groups targeted for report output. Then, if there is an unprocessed group (S814, No), the report output unit 302 returns the process to S808 and performs the process of S808 and the subsequent steps.

In contrast, if the process of S808 to S813 has been performed on all the groups in the list of groups targeted for report output (S814, Yes), the report output unit 302 ends the process of this flowchart.

With the above process, a device usage report in an aggregation period can be output for a device or a group designated by the user. For example, devices such as a device which was replaced and is no longer connected, a device which is currently in connection instead of the device replaced from, and the like that the user wishes to manage collectively are set into a group. This makes it possible to collectively manage the usage state of a device before replaced and a device after replaced as if these devices were a single device. As a result, the user is able to aggregate and collectively understand the usage state of the device before replaced and the device after replaced as if these devices were a single device.

Note that, in each of the embodiments described above, the configuration in which device information including the number of printed sheets from a device is acquired at a set frequency has been described. However, the device information acquired from a device described above may be configured to include operation information such as the number of printed sheets, usage information such as the number of times for use of each function, counter information on a supply part, error information, or the like. Further, pieces of such device information may be accumulated as a history, and a report may be created based on the accumulated information.

In each of the embodiments described above, device information is acquired at a set frequency from a device connected to a network, and in this operation, a device list is generated by adding a newly detected device. For a device on which the device information is acquired out of devices included in the device list, information indicating a "connected" state and the device information are accumulated as device usage information in association with the date and time of the acquisition process. In contrast, for a device on which the device information is not acquired, information indicating an "unconnected" state is accumulated as device usage information in association with the date and time of the acquisition process. Furthermore, for a device designated out of the device list, a report is created based on device usage information corresponding to a designated aggregation period. In accordance with such a configuration, a device usage report in the aggregation period can be output for a device (an image forming device, a printing device) or a group designated by the user regardless of the connection state of the device at the time of report output. That is, it is possible to create a report including not only the usage state of a device which is in connection at the time of the report output but also the usage state of a device which was replaced and is no longer connected. This enables the user to understand the usage state of a device including the usage state of a device which was connected in the past but was replaced and is no longer connected at the time of report output.

The structure and contents of the various data described above are not limited to the above descriptions, and the various data may have various structures and contents depending on the use and purpose.

Although some embodiments have been described above, the present invention may be implemented as, for example, a system, apparatus, method, program, storage medium, or the like. Specifically, the present invention may be applied to a system comprising multiple apparatuses, or may be applied to a device comprising a single apparatus.

In addition, all of the configurations formed by combining the above embodiments are also included in the scope of the present invention.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-189303, filed on Nov. 22, 2021, which is hereby incorporated by reference herein in its entirety.

What is claimed is:

1. An information processing apparatus that executes software configured to acquire and manage device information including at least the number of sheets printed by a printing device, the information processing apparatus comprising:

at least one memory storing instructions; and
at least one processor executing the instructions causing the information processing apparatus to:
perform an acquisition process to acquire the device information at a predetermined frequency from a printing device connected to a network;
for a printing device on which the device information is acquired in the acquisition process out of printing devices that were detected in the network, accumulate the device information in association with an execution date and time of the acquisition process;
for a printing device on which the device information is not acquired in the acquisition process out of printing devices that were detected in the network, additionally associate and accumulate information indicating that the printing device on which the device information is not acquired is not in connection;
generate a list including the printing devices that were detected in the network;
set a group composed of a plurality of printing devices designated from the list; and
create a report including the device information on the printing device on which the device information is acquired and the device information on the printing device on which the device information is not acquired and the execution date and time of the acquisition process based on the accumulated information for the printing devices included in the list,
wherein the report is created for the printing devices included in the list and the group, and wherein the report on the group is a report in which information combining respective pieces of information accumulated for respective printing devices included in the group is created as information on the group.

2. The information processing apparatus according to claim 1, wherein the report is created targeting one or a plurality of printing devices designated out of the printing devices included in the list.

3. The information processing apparatus according to claim 1, wherein when the report is created for the group, a report is created also for each printing device included in the group.

4. The information processing apparatus according to claim 1, wherein a report is created for one or a plurality of printing devices designated out of the printing devices included in the list and for one or a plurality of groups designated out of the set group.

5. The information processing apparatus according to claim 1, wherein the report is created based on information corresponding to a designated period out of the accumulated information.

6. The information processing apparatus according to claim 1, wherein out of the accumulated information, information for which a predetermined period elapsed is deleted.

7. The information processing apparatus according to claim 1, wherein the device information further includes at least any one of the number of times for use of each function, counter information on a supply part, and error information in the printing device.

8. The information processing apparatus according to claim 1, wherein in the report, for the printing device on which the device information is not acquired, the information indicating not in connection is recorded.

9. A method in an information processing apparatus for acquiring and managing device information including at least the number of sheets printed by a printing device, the method comprising:
performing an acquisition process to acquire the device information at a predetermined frequency from a printing device connected to a network;
for a printing device on which the device information is acquired in the acquisition process out of printing devices that were detected in the network, accumulating the device information in association with an execution date and time of the acquisition process;
for a printing device on which the device information is not acquired in the acquisition process out of printing devices that were detected in the network, additionally associating and accumulating information indicating that the printing device on which the device information is not acquired is not in connection;
generating a list including the printing devices that were detected in the network;
setting a group composed of a plurality of printing devices designated from the list; and
creating a report including the device information on the printing device on which the device information is acquired and the device information on the printing device on which the device information is not acquired and the execution date and time of the acquisition process based on the accumulated information for the printing devices included in the list,
wherein the report is created for the printing devices included in the list and the group, and
wherein the report on the group is a report in which information combining respective pieces of information accumulated for respective printing devices included in the group is created as information on the group.

10. A non-transitory computer-readable storage medium on which is stored a computer program for making a computer execute a method for acquiring and managing device information including at least the number of sheets printed by a printing device, the method comprising:
performing an acquisition process to acquire the device information at a predetermined frequency from a printing device connected to a network;
for a printing device on which the device information is acquired in the acquisition process out of printing devices that were detected in the network, accumulating the device information in association with an execution date and time of the acquisition process;
for a printing device on which the device information is not acquired in the acquisition process out of printing devices that were detected in the network, additionally associating and accumulating information indicating that the printing device on which the device information is not acquired is not in connection;
generating a list including the printing devices that were detected in the network;
setting a group composed of a plurality of printing devices designated from the list; and
creating a report including the device information on the printing device on which the device information is acquired and the device information on the printing device on which the device information is not acquired and the execution date and time of the acquisition process based on the accumulated information for the printing devices included in the list,
wherein the report is created for the printing devices included in the list and the group, and
wherein the report on the group is a report in which information combining respective pieces of information accumulated for respective printing devices included in the group is created as information on the group.

11. The non-transitory computer-readable storage medium according to claim 10, wherein the report is created targeting one or a plurality of printing devices designated out of the printing devices included in the list.

12. The non-transitory computer-readable storage medium according to claim 10, wherein when the report is created for the group, a report is created also for each printing device included in the group.

13. The non-transitory computer-readable storage medium according to claim 10, wherein a report is created for one or a plurality of printing devices designated out of the printing devices included in the list and for one or a plurality of groups designated out of the set group.

14. The non-transitory computer-readable storage medium according to claim 10, wherein the report is created based on information corresponding to a designated period out of the accumulated information.

15. The non-transitory computer-readable storage medium according to claim 10, wherein out of the accumulated information, information for which a predetermined period elapsed is deleted.

16. The non-transitory computer-readable storage medium according to claim 10, wherein the device information further includes at least any one of the number of times for use of each function, counter information on a supply part, and error information in the printing device.

* * * * *